(12) United States Patent
McCarthy, Jr. et al.

(10) Patent No.: US 7,950,226 B2
(45) Date of Patent: May 31, 2011

(54) LNT-SCR SYSTEM OPTIMIZED FOR THERMAL GRADIENT

(75) Inventors: James Edward McCarthy, Jr., Canton, MI (US); Owen Herman Bailey, Lake Orion, MI (US)

(73) Assignees: Eaton Corporation, Cleveland, OH (US); Umicore AG & Co. KG, Hanau-Wolfgang (DE)

( * ) Notice: Subject to any disclaimer, the term of this patent is extended or adjusted under 35 U.S.C. 154(b) by 1051 days.

(21) Appl. No.: 11/803,204

(22) Filed: May 14, 2007

(65) Prior Publication Data
US 2008/0282670 A1 Nov. 20, 2008

(51) Int. Cl.
*F01N 3/10* (2006.01)
(52) U.S. Cl. ............ 60/301; 60/274; 60/285; 60/286; 60/295; 60/303; 60/170; 60/172; 60/182
(58) Field of Classification Search .......... 60/274, 60/285, 286, 295, 297, 301, 303; 422/170, 422/171, 172, 177, 182
See application file for complete search history.

(56) References Cited

U.S. PATENT DOCUMENTS

| 6,109,024 | A | 8/2000 | Kinugasa et al. | |
| 6,176,079 | B1 | 1/2001 | Konrad et al. | |
| 6,269,634 | B1 * | 8/2001 | Yokota et al. | 60/286 |
| 6,391,822 | B1 | 5/2002 | Dou et al. | |
| 6,539,709 | B2 * | 4/2003 | Kubo et al. | 60/301 |
| 6,732,507 | B1 | 5/2004 | Stanglmaier et al. | |
| 6,823,662 | B1 * | 11/2004 | Yamamoto et al. | 60/286 |
| 6,832,473 | B2 * | 12/2004 | Kupe et al. | 60/286 |
| 6,938,412 | B2 * | 9/2005 | Li et al. | 60/300 |
| 7,063,642 | B1 * | 6/2006 | Hu et al. | 477/100 |
| 7,082,753 | B2 | 8/2006 | Dalla betta et al. | |
| 7,332,135 | B2 * | 2/2008 | Gandhi et al. | 422/177 |
| 7,389,638 | B2 * | 6/2008 | Weissman et al. | 60/286 |
| 7,644,578 | B2 * | 1/2010 | Goulette et al. | 60/286 |
| 2006/0010857 | A1 | 1/2006 | Hu et al. | |

* cited by examiner

*Primary Examiner* — Tu M Nguyen
(74) *Attorney, Agent, or Firm* — Paul V. Keller

(57) ABSTRACT

In an exhaust aftertreatment system, two LNTs having differing compositions are configured in series downstream from an inline fuel reformer. The downstream LNT is adapted for desulfation at higher temperatures than the upstream LNT. During desulfation, the system develops temperature gradients with the temperatures increasing in the direction of exhaust flow. The ordering of the LNTs is designed utilize these gradients. In a preferred embodiment, the system also includes two SCR catalysts having different compositions. The SCR catalyst with a composition adapted to tolerate higher temperatures is located nearer the downstream end of the system.

20 Claims, 5 Drawing Sheets

LNT-SCR SYSTEM OPTIMIZED FOR THERMAL GRADIENT

FIELD OF THE INVENTION

The present invention relates to pollution control systems and methods for diesel and lean burn gasoline engines.

BACKGROUND $NO_x$ emissions from diesel engines are an environmental problem. Several countries, including the United States, have long had regulations pending that will limit $NO_x$ emissions from trucks and other diesel-powered vehicles. Manufacturers and researchers have put considerable effort toward meeting those regulations.

In gasoline powered vehicles that use stoichiometric fuel-air mixtures, three-way catalysts have been shown to control $NO_x$ emissions. In diesel-powered vehicles, which use compression ignition, the exhaust is generally too oxygen-rich for three-way catalysts to be effective.

Several solutions have been proposed for controlling $NO_x$ emissions from diesel-powered vehicles. One set of approaches focuses on the engine. Techniques such as exhaust gas recirculation and partially homogenizing fuel-air mixtures are helpful, but these techniques alone will not eliminate $NO_x$ emissions. Another set of approaches remove $NO_x$ from the vehicle exhaust. These include the use of lean-burn $NO_x$ catalysts, selective catalytic reduction (SCR), and lean $NO_x$ traps (LNTs).

Lean-burn $NO_x$ catalysts promote the reduction of $NO_x$ under oxygen-rich conditions. Reduction of $NO_x$ in an oxidizing atmosphere is difficult. It has proven challenging to find a lean-burn $NO_x$ catalyst that has the required activity, durability, and operating temperature range. The introduction of a reductant, such as diesel fuel, into the exhaust is generally required and introduces a fuel penalty of 3% or more. Currently, peak $NO_x$ conversion efficiencies for lean-burn $NO_x$ catalysts are unacceptably low.

SCR generally refers to selective catalytic reduction of $NO_x$ by ammonia. The reaction takes place even in an oxidizing environment. The $NO_x$ can be temporarily stored in an adsorbent or ammonia can be fed continuously into the exhaust. SCR can achieve high levels of $NO_x$ reduction, but there is a disadvantage in the lack of infrastructure for distributing ammonia or a suitable precursor. Another concern relates to the possible release of ammonia into the environment.

To clarify the state of a sometime ambiguous nomenclature, it should be noted that in the exhaust aftertreatment art, the terms "SCR catalyst" and "lean $NO_x$ catalyst" are occasionally used interchangeably. Where the term "SCR" is used to refer just to ammonia-SCR, as it often is, SCR is a special case of lean $NO_x$ catalysis. Commonly when both types of catalysts are discussed in one reference, SCR is used with reference to ammonia-SCR and lean $NO_x$ catalysis is used with reference to SCR with reductants other than ammonia, such as SCR with hydrocarbons.

LNTs are devices that adsorb $NO_x$ under lean exhaust conditions and reduce and release the adsorbed $NO_x$ under rich conditions. A LNT generally includes a $NO_x$ adsorbent and a catalyst. The adsorbent is typically an alkaline earth compound, such as $BaCO_3$ and the catalyst is typically a combination of precious metals, such as Pt and Rh. In lean exhaust, the catalyst speeds oxidizing reactions that lead to $NO_x$ adsorption. In a reducing environment, the catalyst activates reactions by which adsorbed $NO_x$ is reduced and desorbed. In a typical operating protocol, a reducing environment is created within the exhaust from time-to-time to regenerate (denitrate) the LNT.

A LNT can produce ammonia during denitration. Accordingly, it has been proposed to combine a LNT and an ammonia-SCR catalyst into one system. Ammonia produced by the LNT during regeneration is captured by the SCR catalyst for subsequent use in reducing $NO_x$, thereby improving conversion efficiency over a stand-alone LNT with no increase in fuel penalty or precious metal usage. U.S. Pat. No. 6,732,507 describes such a system. U.S. Pat. Pub. No. 2004/0076565 describes such systems wherein both components are contained within a single shell or disbursed over one substrate.

In addition to accumulating $NO_x$, LNTs accumulate $SO_X$. $SO_X$ is the combustion product of sulfur present in ordinarily fuel. Even with reduced sulfur fuels, the amount of $SO_X$ produced by combustion is significant. $SO_X$ adsorbs more strongly than $SO_X$ and necessitates a more stringent, though less frequent, regeneration. Desulfation requires elevated temperatures as well as a reducing atmosphere. The temperature of the exhaust can be elevated by engine measures, particularly in the case of a lean-burn gasoline engine, however, at least in the case of a diesel engine, it is often necessary to provide additional heat. Typically, this heat is provided through the same types of reactions as used to remove excess oxygen from the exhaust. The temperature of the LNT is generally controlled during desulfation as the temperatures required for desulfation are generally close to those at which the LNT undergoes thermal deactivation.

Creating a reducing environment for LNT regeneration involves eliminating most of the oxygen from the exhaust and providing a reducing agent. Except where the engine can be run stoichiometric or rich, a portion of the reductant reacts within the exhaust to consume oxygen. The amount of oxygen to be removed by reaction with reductant can be reduced in various ways. If the engine is equipped with an intake air throttle, the throttle can be used. However, at least in the case of a diesel engine, it is generally necessary to eliminate some of the oxygen in the exhaust by combustion or reforming reactions with reductant that is injected into the exhaust.

The reactions between reductant and oxygen can take place in the LNT, but it is generally preferred for the reactions to occur in a catalyst upstream of the LNT, whereby the heat of reaction does not cause large temperature increases within the LNT at every regeneration.

Reductant can be injected into the exhaust by the engine or a separate fuel injection device. For example, the engine can inject extra fuel into the exhaust within one or more cylinders prior to expelling the exhaust. Alternatively, or in addition, reductant can be injected into the exhaust downstream from the engine.

U.S. Pat. No. 6,832,473 describes a system wherein the reductant is reformate produced outside the exhaust stream and injected into the exhaust as needed. During desulfations, the reformate is injected upstream from an oxidation catalyst. Heat generated by combustion of the reformate over the oxidation catalyst is carried by the exhaust to the LNT and raises the LNT to desulfations temperatures.

U.S. Pat. Pub. No. 2004/0050037 (hereinafter "the '037 publication") describes an exhaust treatment system with a fuel reformer placed in the exhaust line upstream of a LNT. The reformer includes both oxidation and steam reforming catalysts. The reformer both removes excess oxygen and converts the diesel fuel reductant into more reactive reformate. For desulfations, heat produced by the reformer is used to raise the LNT to desulfations temperatures.

WO 2004/090296 describes a system wherein there is an inline reformer upstream of a LNT and a SCR catalyst. The reformer has a high thermal mass and is intended to operate at exhaust gas temperatures. The engine is used to heat the exhaust system devices, as needed.

The operation of an inline reformer can be modeled in terms of the following three reactions:

$$0.684\ CH_{1.85} + O_2 \rightarrow 0.684\ CO_2 + 0.632\ H_2O \quad (1)$$

$$0.316\ CH_{1.85} + 0.316\ H_2O \rightarrow 0.316\ CO + 0.608\ H_2 \quad (2)$$

$$0.316\ CO + 0.316\ H_2O \rightarrow 0.316\ CO_2 + 0.316\ H_2 \quad (3)$$

wherein $CH_{1.85}$ represents an exemplary reductant, such as diesel fuel, with a 1.85 ratio between carbon and hydrogen. Equation (1) is exothermic complete combustion by which oxygen is consumed. Equation (2) is endothermic steam reforming. Equation (3) is the water gas shift reaction, which is comparatively thermal neutral and is not of great importance in the present disclosure, as both CO and $H_2$ are effective for regeneration.

The inline reformer of the '037 publication is designed to be rapidly heated and to then catalyze steam reforming. Temperatures from about 500 to about 700° C. are said to be required for effective reformate production by this reformer. These temperatures are substantially higher than typical diesel exhaust temperatures. The reformer is heated by injecting fuel at a rate that leaves the exhaust lean, whereby Reaction (1) takes place. After warm up, the fuel injection rate is increased to provide a rich exhaust. Depending on such factors as the exhaust oxygen concentration, the fuel injection rate, and the exhaust temperature, the reformer tends to either heat or cool as reformate is produced.

In theory, the temperature of the reformer can be controlled through the fuel injection rate. For example if the reformer is heating, the fuel injection rate can be increased to increase the extent of Reaction (2) (endothermic steam reforming) while the extent of Reaction (1) (exothermic complete combustion), which is limited by the exhaust oxygen concentration, remains essentially constant. In practice, this approach often cannot be used. The size and catalyst loading of the reformer are limited for economic reasons, among others, and the efficiency of the fuel reformer is generally insufficient to accommodate high fuel injection rates. As a result, the reformer tends to heat as reformate is being produced, particularly when exhaust oxygen concentrations are in the 8-15% range.

One approach suggested by the '037 application for controlling this heating is to pulse the fuel injection. The reformer is allowed to cool between pulses. In this manner, the reformer can be kept at a desired temperature while a LNT regeneration completes. A desired temperature is, for example, 600° C.±50° C.

In spite of advances, there continues to be a long felt need for an affordable and reliable exhaust treatment system that is durable, has a manageable operating cost (including fuel penalty), and is practical for reducing NOx emissions from diesel engines to a satisfactory extent in the sense of meeting U.S. Environmental Protection Agency (EPA) regulations effective in 2010 and other such regulations

SUMMARY

The inventors have found that in a preferred mode of operation for an inline fuel reformer-LNT exhaust treatment system, temperatures tend to increase with respect to the direction of exhaust flow during regenerations. The increasing temperature trend can be created in certain reformer-LNT systems by pulsing fuel injection to the reformer at a suitable frequency over the course of a desulfation. The pulsing creates alternating lean and rich phases. Reductant from lean phases reacts with oxygen from rich phases to generate heat in the LNT.

One of the inventors' concepts is to configure the LNT as a series of two or more LNTs having differing compositions. A LNT nearer the back of the system is adapted to undergo desulfation at higher temperatures than a LNT nearer the front of the system. The system provides for efficient desulfation when a temperature gradient develops in the direction of the exhaust flow during desulfation. Both LNTs can be desulfated effectively without overheating either LNT. This arrangement obviates the need to operate the fuel reformer-LNT system in a manner that a rising temperature gradient does not develop. In one embodiment, the adaptation for desulfation at a higher temperature comprises a higher minimum temperature at which the downstream LNT can undergo desulfation at an effective rate. In another embodiment, the adaptation comprises a higher maximum safe operating temperature.

In a preferred embodiment, the system also comprises one or more SCR catalysts. In a more preferred embodiment, the system comprises at least two SCR catalysts having different compositions. The SCR catalyst nearer the front of the system is preferably positioned between the first and the second LNT. The SCR catalyst able to endure higher temperatures is located nearer the back of the system Another of the inventors' concepts relates to a power generation system comprising an engine operative to produce exhaust, a fuel reformer configured to receive at least a portion of the exhaust, a first LNT configured to receive at least a portion of the exhaust from the fuel reformer, and a second LNT configured to receive at least a portion of the exhaust from the first LNT. Each of the LNTs is adapted to store $NO_x$ when the exhaust is lean and to reduce stored $NO_x$ and regenerate when the exhaust is rich and contains reformate. The first LNT is adapted to be desulfated at lower temperatures than the second LNT.

A still further one of the inventor's concepts relates to a method of operating a power generation system. The method includes operating an engine to produce an exhaust, channeling the exhaust to a fuel reformer, channeling the exhaust from the fuel reformer to a first LNT that adsorbs and stores a first portion of $NO_x$ from the exhaust, channeling the exhaust from the first LNT to a second LNT, generating a first control signal to denitrate the LNTs, in response to the first control signal, supplying rich exhaust to the fuel reformer whereby the fuel reformer produces a reformate-containing rich exhaust-reductant mixture that denitrates the LNTs, generating a second control signal to desulfate the LNTs, and in response to the second control signal, heating the LNTs and then supplying rich exhaust to the fuel reformer, whereby the fuel reformer produces a reformate-containing rich exhaust-reductant that desulfates the LNTs. The reformer is fueled in such a way that the second LNT reaches a higher peak volume average temperature than the first LNT during the desulfation. The first and second LNTs are selected to have different formulations providing different minimum effective desulfation temperatures and different maximum safe desulfation temperatures. In one embodiment, the formulations provide significantly different minimum effective desulfation temperatures and the formulation having the lower minimum effective desulfation temperature is used as the first LNT. In another embodiment, the formulations provide significantly different maximum safe desulfation temperatures and the formulation having the higher maximum safe desulfation temperature is used as the second LNT.

The primary purpose of this summary has been to present certain of the inventors' concepts in a simplified form to facilitate understanding of the more detailed description that follows. This summary is not a comprehensive description of every one of the inventors' concepts or every combination of the inventor's concepts that can be considered "invention". Other concepts of the inventors will be conveyed to one of ordinary skill in the art by the following detailed description and the accompanying drawings. The specifics disclosed herein may be generalized, narrowed, and combined in various ways with the ultimate statement of what the inventors claim as their invention being reserved for the claims that follow.

DETAILED DESCRIPTION

Figure 1:
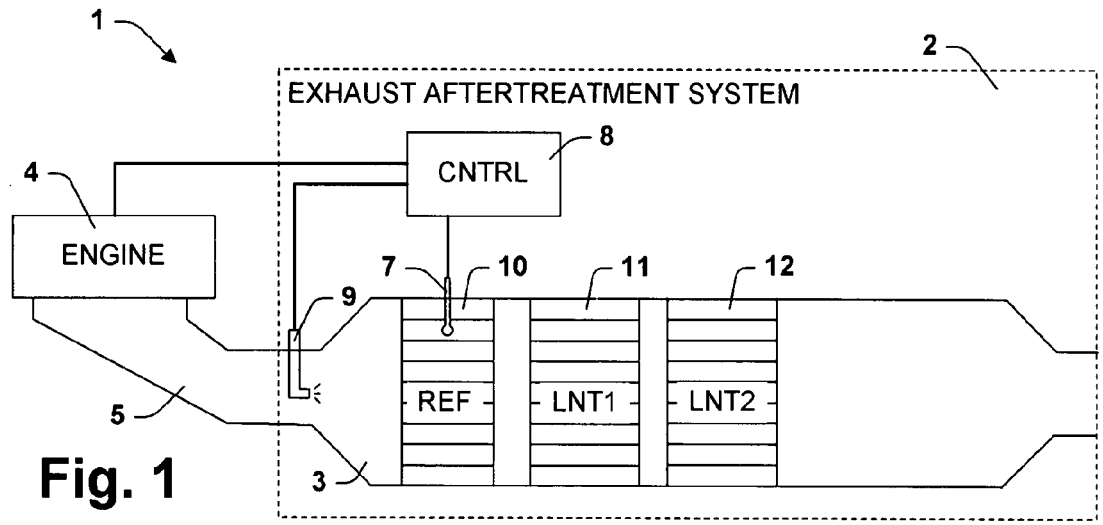
FIG. 1 is schematic illustration of an exemplary power generation system consistent with one of the inventor's concepts.
Figure 9:
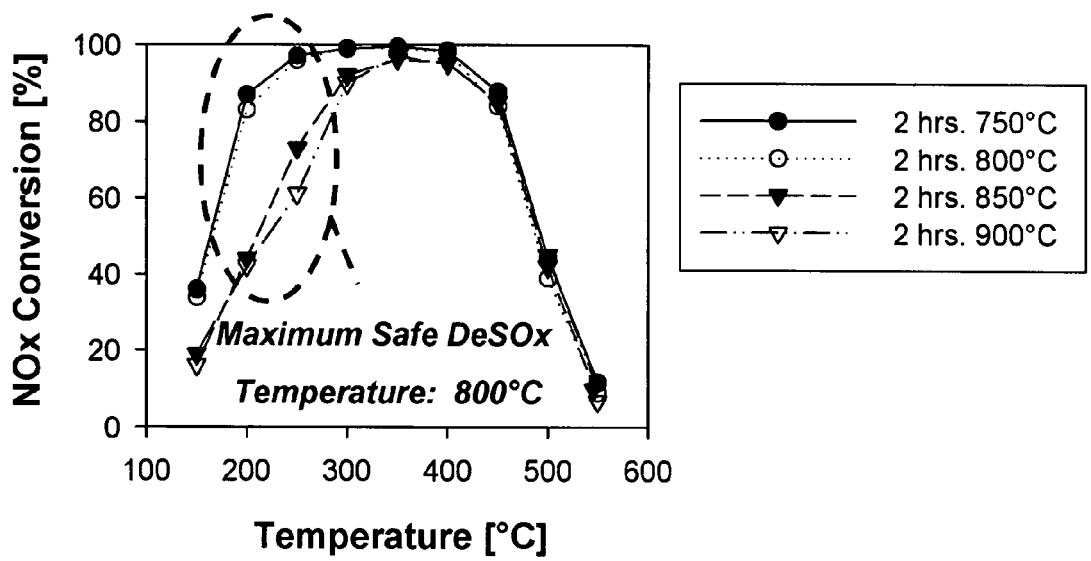
FIG. 9 is a plot showing the NOX removal efficiencies of an LNT following desulfation at a series of progressively increasing temperatures.

FIG. 1 is a schematic illustration of an exemplary power generation system 1 conceived by the inventors. The power generation system 1 comprises an engine 4 connected to an exhaust aftertreatment system 2 by a manifold 5. The exhaust aftertreatment system 2 includes a controller 8 and an exhaust line 3 defining a direction of exhaust flow beginning from the manifold 5. Arranged in series with respect to the direction of the exhaust flow within the exhaust line 3 are a fuel injector 9, a fuel reformer 10, a first lean $NO_X$-trap (LNT) 11 and a second LNT 12. The controller 8 may be an engine control unit (ECU) that also controls the exhaust aftertreatment system 2 or may include several control units that collectively perform these functions.

During lean operation (a lean phase), the LNTs 11 and 12 adsorb $NO_X$ from the exhaust. From time-to-time, a rich phase is initiated to regenerate the LNTs to remove some or all of the adsorbed $NO_X$ (to denitrate the LNTs). Denitration may involve heating the reformer 10 to an operational temperature and then injecting fuel using the fuel injector 9 to make a rich exhaust-fuel mixture. The fuel reformer 10 uses the injected fuel to consume most of the oxygen in the exhaust while producing reformate. The reformate thus produced reduces $NO_X$ adsorbed in the LNTs 11 and 12.

The time at which to regenerate the LNTs 11 and 12 to remove accumulated $NO_X$ can be determined by any suitable method. Examples of methods of determining when to begin a regeneration include initiating a regeneration upon reaching a threshold in any of a $NO_X$ concentration in the exhaust downstream from the LNTs 11 and 12, a total amount of $NO_X$ emissions per mile or brake horsepower-hour since the last regeneration, a total amount of engine out $NO_X$ since the last regeneration, an estimate of $NO_X$ loading in the LNTs 11 and 12, and an estimate of adsorption capacity remaining in the LNTs 11 and 12. Regeneration can be periodic or determined by feed forward or feedback control. Regeneration can also be opportunistic, being triggered by engine operating conditions that favor low fuel penalty regeneration. The time at which to regenerate the LNTs 11 and 12 can be determined by the controller 8, which generates a control signal that initiates the regeneration process.

From time-to-time, the LNTs 11 and 12 must also be regenerated to remove accumulated sulfur compounds (desulfated). Desulfation involves heating the reformer 10, heating the LNTs 11 and 12 to desulfating temperatures, and providing the heated LNTs 11 and 12 with a rich atmosphere. Desulfating temperatures vary, but are typically in the range from about 500 to about 900° C., the exact range depending on the LNT composition. Below minimum temperatures, desulfation is very slow. Above maximums temperatures, the LNTs 11 and 12 may deteriorate rapidly and undergo a significant loss of activity in a relatively short period of time.

Figure 2:
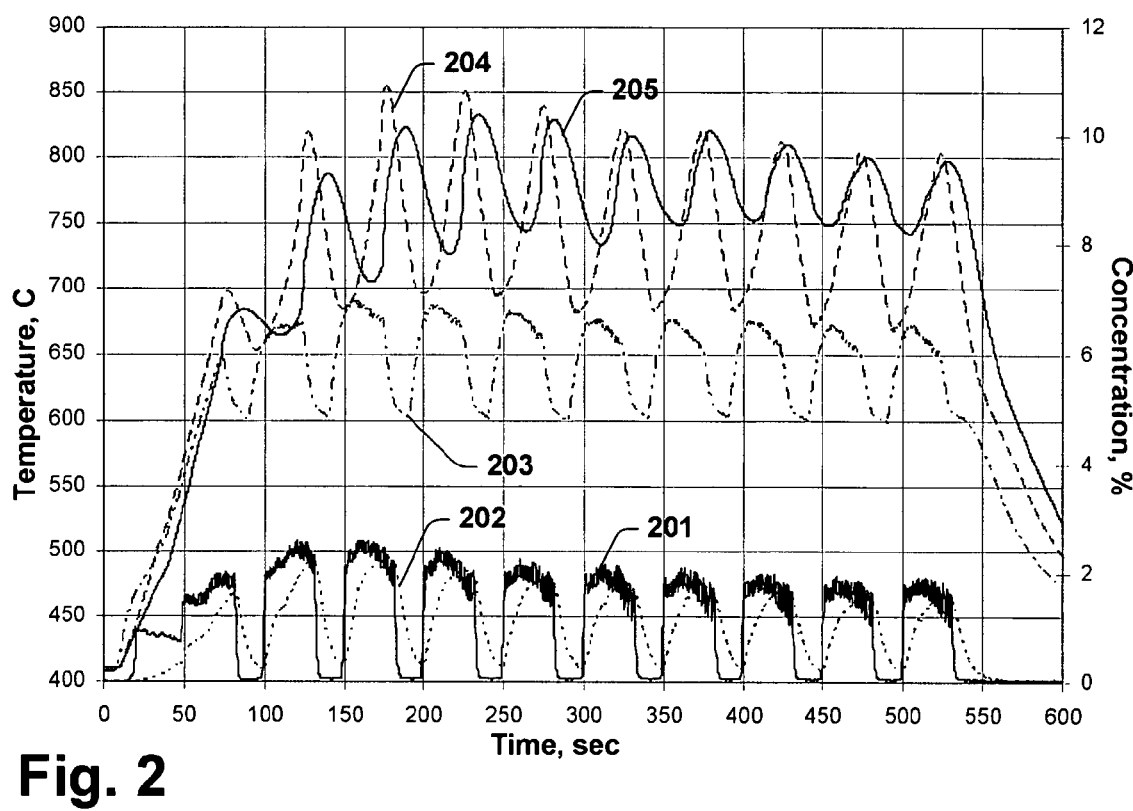
FIG. 2 is plot of reductant concentrations and LNT temperatures during desulfation of the system illustrated in FIG. 1.

A maximum desulfation temperatures is the highest temperature at which an LNT can be desulfated without undergoing an unacceptable loss of activity. Above a certain temperature the rates of deterioration increase rapidly. FIG. 2 illustrates an exemplary process for determining an approximate maximum safe desulfation temperature. In the process, an LNT is desulfated for two hour periods beginning at 750° C. and increasing by 50° C. with each successive desulfation. Between each desulfation, $NO_X$ conversion rates are measured. As illustrated by FIG. 2, after the first two desulfations, the $NO_X$ conversion rates remain substantially unchanged. After desulfation at 850° C., however, there is a substantial reduction in $NO_X$ conversion rates within the lower part of the LNT operating temperature range. This drop in $NO_X$ conversion rates is substantial and results in unacceptably low conversions. Accordingly, the maximum safe desulfation temperature for this sample is about 800° C.

The times at which to desulfate the LNTs 11 and 12 can be determined in any suitable fashion. Desulfation may be scheduled periodically, e.g., after every 5-30 hours of operation. Alternatively, desulfation may be scheduled based on an estimate of the amount on $SO_X$ stored in the LNTs 11 and 12. The amount of stored $SO_X$ can be assumed to increase in proportion to fuel usage and to decrease in a manner dependent on the extent of desulfations. A further option is to determine the need for desulfation based on system performance, e.g., based on the activity of the LNTs 11 and 12 following an extensive denitration or based on the frequency with which denitration is required.

The primary means of heating the LNTs 11 and 12 is heat convection from the reformer 10. To generate this heat, fuel can be supplied to the reformer 10 at a rate that leaves the resulting exhaust-fuel mixture overall lean, whereby the supplied fuel undergoes complete combustion in the reformer 10. Once the reformer 10 is heated, the fuel injection rate is increased to provide a rich exhaust-fuel mixture. During the rich phase, the temperatures of the LNTs 11 and 12 are strongly affected by the temperature of the reformer 10, although other factors affect the temperatures of the LNTs 11 and 12 as discussed below.

During desulfation, and sometimes during denitration as well, it can be difficult to limit the temperature of the fuel reformer 10 without pulsing the fuel injection. Pulsation is used to allow the fuel reformer 10 to cool between pulses. During pulses, the fuel injection rate is selected to consume excess oxygen from the exhaust and provide a desired concentration of reductant. Between pulses, no fuel is injected and the fuel reformer 10 is allowed to cool. In an exemplary embodiment, the end of each fuel pulse is set to when the reformer 10 reaches a maximum temperature. The periods between pulses can be extended for a fixed time, to provided a fixed amount of cooling of the reformer 10, or until the reformer 10 reaches a predetermined minimum temperature.

While heat convection from the reformer 10 is the primary means of heating the LNTs 11 and 12, the LNTs 11 and 12 can also be heated in part by combustion within them. Heating the LNTs 11 and 12 by combustion within them reduces the peak temperature at which the reformer 10 must be operated and allows the LNTs 11 and 12 to be operated at higher temperatures than the reformer 10.

Combustion within the LNTs 11 and 12 can occur through the reaction of reductants provided to the LNTs 11 and 12 under overall rich conditions with oxygen provided to the LNTs 11 and 12 under overall lean conditions. Reductants, such as syn gas and unreformed or partially reformed fuel, slip to the LNTs 11 and 12 during rich phases. These reductants can react during the rich phases with oxygen stored in the LNTs 11 and 12 from a previous lean phase. This mechanism can be promoted by providing the LNTs 11 and 12 with oxygen storage capacity. Alternatively or in addition, reductants can be adsorbed and stored in the LNTs 11 and 12 during the rich phase and react with oxygen provided to the LNTs 11 and 12 during the lean phases. Hydrocarbons are better candidates for adsorption and storage than syn gas. This mechanism can be promoted by providing the LNTs 11 and 12 with hydrocarbon adsorption capacity. Allowing some hydrocarbon slip from the fuel reformer 10 can also promote this mechanism. Other mechanisms may result in combustion, including mixing of gases from lean and rich phases and storage of reductants or oxygen on walls or other locations upstream from the LNTs 11 and 12.

Regardless of the mechanism, the extent of heating by combustion within the LNTs 11 and 12 is susceptible to control by varying the parameters of pulsation. The amount of combustion increases as the frequency of the pulses increases. The amount of combustion generally also increases as rich periods are made shorter if higher fuel injection rates are used during the rich periods to maintain the total fuel injection amount. When the rich periods are made shorter, the lean periods can be made longer to maintain the pulse frequency.

Figure 3:
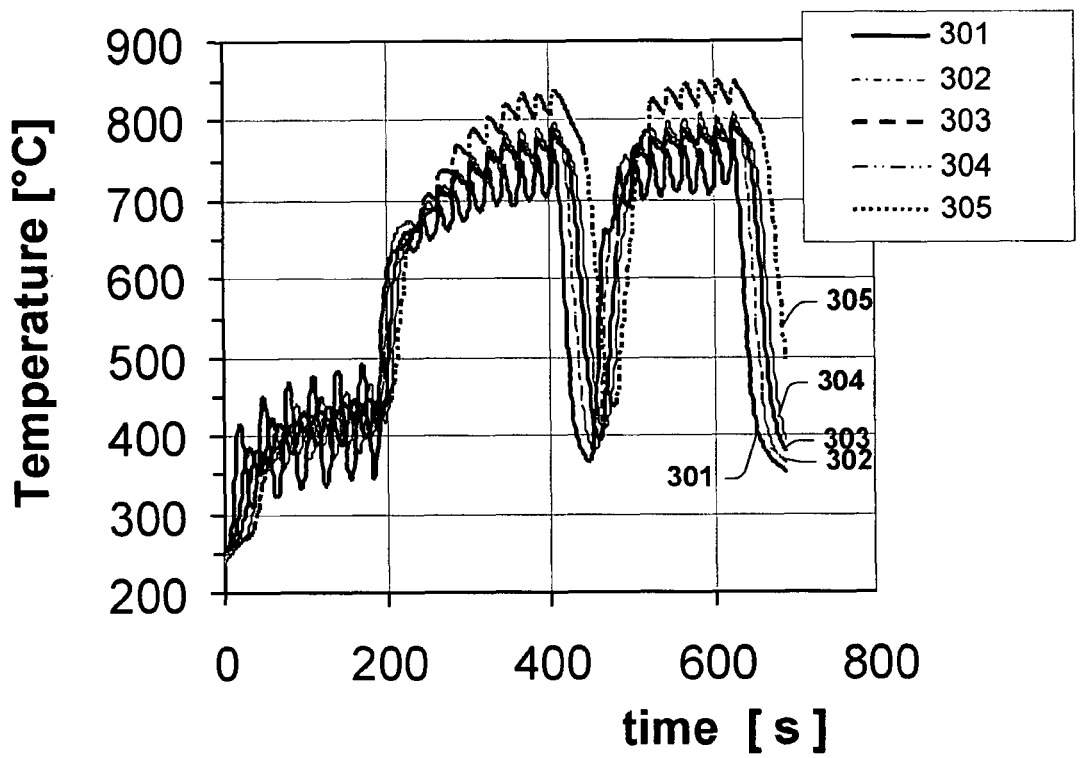
FIG. 3 is a plot of temperatures in an LNT during a desulfation with pulsed fuel injection to a fuel reformer upstream from the LNT.

Even when the LNTs 11 and 12 are not specifically designed to adsorb either reductants or oxygen, fuel pulsing to the fuel reformer 10 can result in reductant and oxygen mixing and combusting in the LNTs 11 and 12. Data regarding this phenomena are provided in FIG. 3. The data in FIG. 3 were gathered for a power generation system configured as illustrated in FIG. 1. During desulfation, the fuel injection was pulsed to give the reformate concentration profiles illustrated by lines 201 (CO) and 202 ($H_2$). Line 203 plots temperature readings obtained from a thermocouple in the LNT brick 11 1" from its entrance. Line 204 plots temperature readings obtained from a thermocouple in the LNT brick 11 1" from its exit. Line 205 plots temperature readings obtained from a thermocouple in the LNT brick 12 1" from its exit. Both LNTs were about 6 inches long and 6 inches in diameter. The plots show that peak temperatures increased along the direction of flow, with peak temperatures near the exit of the two brick system being about 150° C. higher than peak temperatures near the front of the system. The data show that the temperatures of the downstream LNT 12, particularly the time averaged temperatures, the volume averaged temperatures, and the peak temperatures, were higher than those of the upstream LNT 11.

Figure 4:
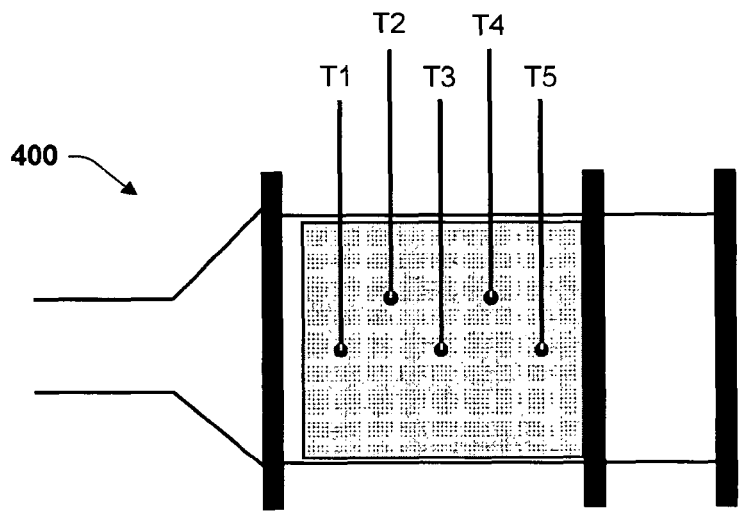
FIG. 4. is an illustration of a LNT indicating the positions of the thermocouples used to obtain the data plotted in FIG. 3.
Figure 5:
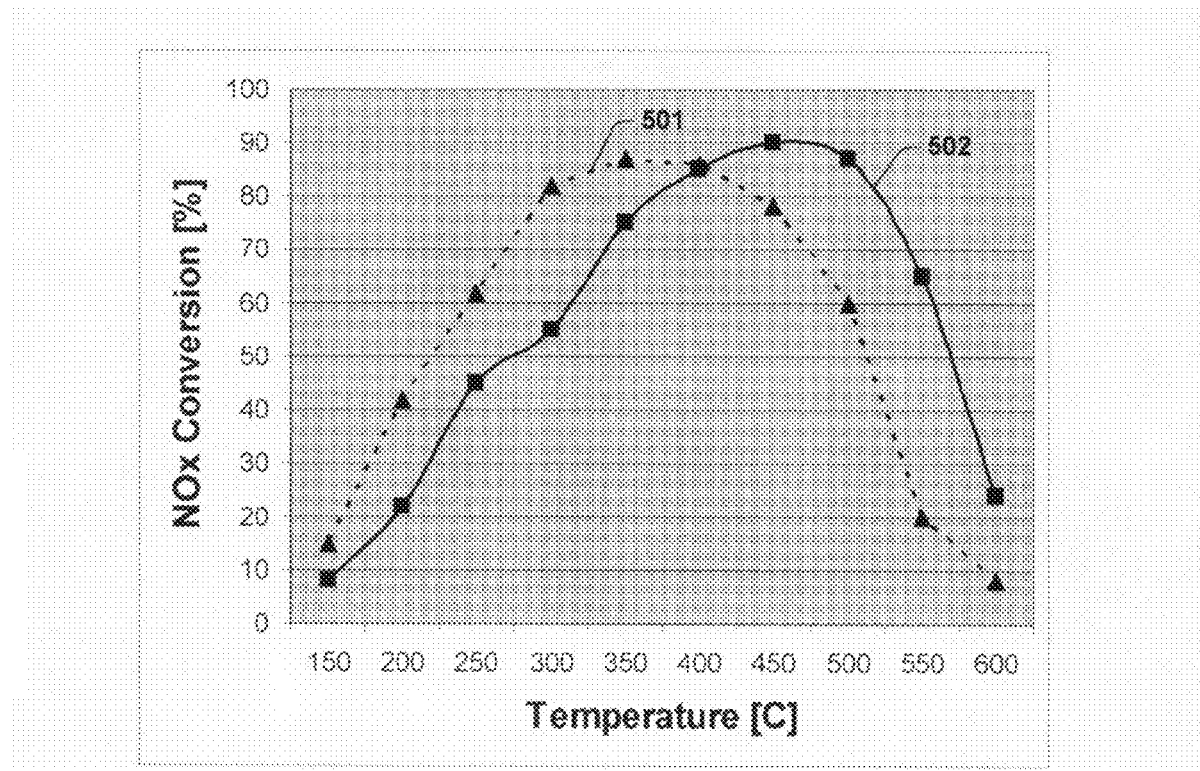
FIG. 5 is a plot showing effective operating temperature ranges for two LNTs having different formulations.
Figure 6:
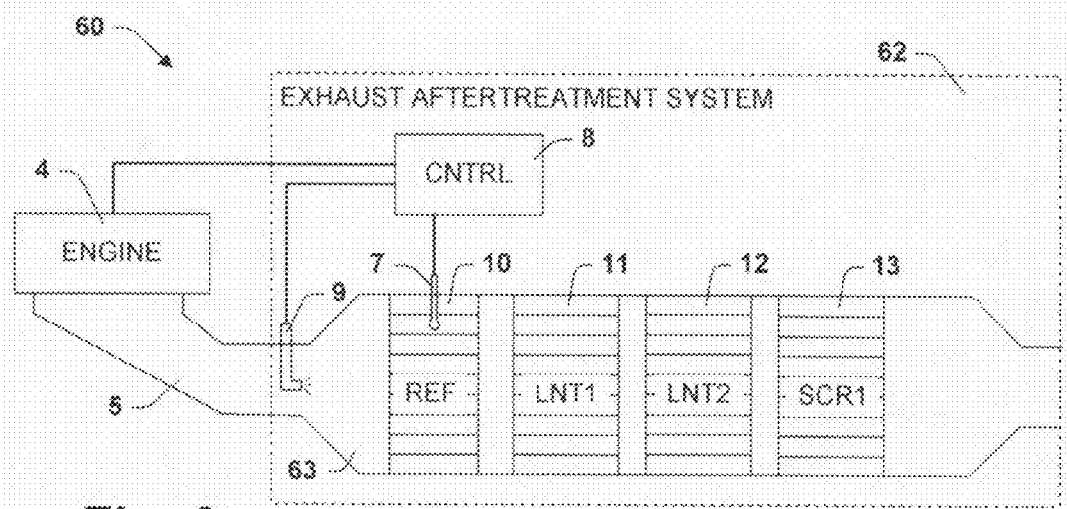
FIG. 6 is a schematic illustration of another exemplary power generation system conceived by the inventor.

FIG. 4 plots another set of temperatures measured in an LNT over the course of a desulfation carried out with pulsed fuel injection and an upstream fuel reformer. Curves 301, 302, 303, 304, and 305 are temperatures from thermocouples at the positions indicated by T1, T2, T3, T4, and T5 respectively of the LNT brick 400 illustrated in FIG. 5. The plots show that peak and average temperatures were increasing along the direction of flow, with peak and average temperatures near the exit of the brick 400 being about 100° C. higher than peak an average temperatures near the front of the brick 400.

While the power generation system 1 could be designed and operated in such a manner that the LNTs 11 and 12 have substantially similar temperatures or with the LNT 12 having lower temperatures than the LNT 11 during desulfation, the inventors' concept is to adapt the power generation system 1 for desulfation with the LNT 12 having higher temperatures than the LNT 11. This concept allow the reformer 10 to be operated in a preferred manner while effectively desulfating the LNTs 11 and 12.

According to inventors' concept, the LNT 11 has a first composition and the LNT 12 has a second, different composition whereby the LNT 12 is adapted for desulfation at higher temperatures than the LNT 11. The LNTs 11 and 12 can comprise separate substrate bricks or a single substrate coated with different materials at either end. For example, LNTs 11 and 12 can be formed by taking a cordierite monolith substrate, coating one end with a first $NO_X$ adsorbent forming composition to form the LNT 11, and coating the other end with a second $NO_X$ adsorbent forming composition to form the LNT 12. On the other hand, forming the LNTs 11 and 12 as separate bricks facilitates their developing a large temperature difference during desulfation and the inventors' concepts take advantage of such large temperature differences.

The LNT 12 is adapted for desulfation at higher temperatures than the LNT 11. In one embodiment, being adapted for desulfation at higher temperatures means that a higher minimum temperature is required for desulfation rates to reach adequate levels at which desulfation can be effectuated in an acceptable period of time. Preferably, the minimum effective desulfation temperature for the first LNT 11 is at least about 25° C. lower than that of the LNT 12, more preferably at least about 50° C. lower, optionally at least about 100° C. lower.

A minimum effective desulfation temperature can be defined in any suitable fashion. For example, a minimum effective temperature could be defined as the temperature at which a LNT releases 80% of its adsorbed sulfur in 15 minutes in a reducing atmosphere with a typical concentration of a typical reductant. A typical reductant could be a 50/50 mixture of CO and $H_2$ and a typical concentration could be 4%.

In another embodiment, being adapted for desulfation at higher temperatures means an ability to endure higher temperatures. Preferably, the LNT 12 is adapted to have a maximum safe desulfation temperature that is at least about 25° C. higher than that of the LNT 11, more preferably at least about 50° C. higher, optionally at least about 100° C. higher.

The inventors' concept can be effectively practiced using commercially available LNTs. Any two LNTs can be used. Each LNT will have a different minimum effective desulfation temperature and each will have a maximum safe desulfation temperature. Practicing the invention comprises evaluating the properties of the LNTs and placing them in an exhaust treatment system in the order determined by one or the other embodiment of the inventors' concept.

As an example, the LNT 11 could be a barium-based LNT that can be desulfated in a temperature range from about 630° C. to about 820° C. while the LNT 12 can be a potassium-based LNT than can be desulfated in a temperature range range from about 750° C. to about 850° C. Below the minimum temperature, desulfation is unacceptably slow. Above the maximum temperature, the LNT undergoes rapid deterioration and loses an excessive amount of activity over the course of several desulfations.

The minimum effective desulfation temperatures and maximum safe desulfation temperatures can be adjusted through the substrate compositions, the washcoat compositions, and the trapping and catalyst material concentrations and compositions. By adjusting these parameters, the LNTs 11 and 12 can be adapted as desired to work in cooperation with a temperature gradient.

In another example, both LNTs are barium-based essentially free from potassium and comprise a combination of the precious metals Pt, Pd, and Rh. To adapt the second LNT 12 for desulfation at high temperature, the second LNT 12 is given a substantially higher platinum loading than the first LNT 11, preferably at least about 25% higher, more preferably at least about 50% higher, and still more preferably at least about twice as high. For example the precious metal content of the first LNT 11 can consist of 50 g/ft$^3$ platinum and 5 g/ft$^3$ rhodium the precious metal content of the second LNT 12 can consist of 100 g/ft$^3$ platinum and 5 g/ft$^3$ rhodium. Due to the higher precious metal loading, the second LNT 12 has a higher maximum safe desulfation temperature. The Pt loading of the first LNT 11 is preferably kept as low as possible consistent with its function. A minimum Pt loading for the first LNT is generally in the range from about 10 g/ft$^3$ to about 75 g/ft$^3$.

Like LNTs, SCR catalysts have limited effective operating temperature ranges and maximum temperatures above which they undergo deterioration. The operating temperature ranges for SCR catalyst are generally wider than those of LNTs, but are still limited. In the power generation system 500, the SCR catalyst 13 must be selected to endure the maximum desulfation temperatures generated by the LNT 12. This selection may involve giving up SCR catalytic performance at the lower exhaust temperatures that occur in the power generation system 500.

Figure 7:
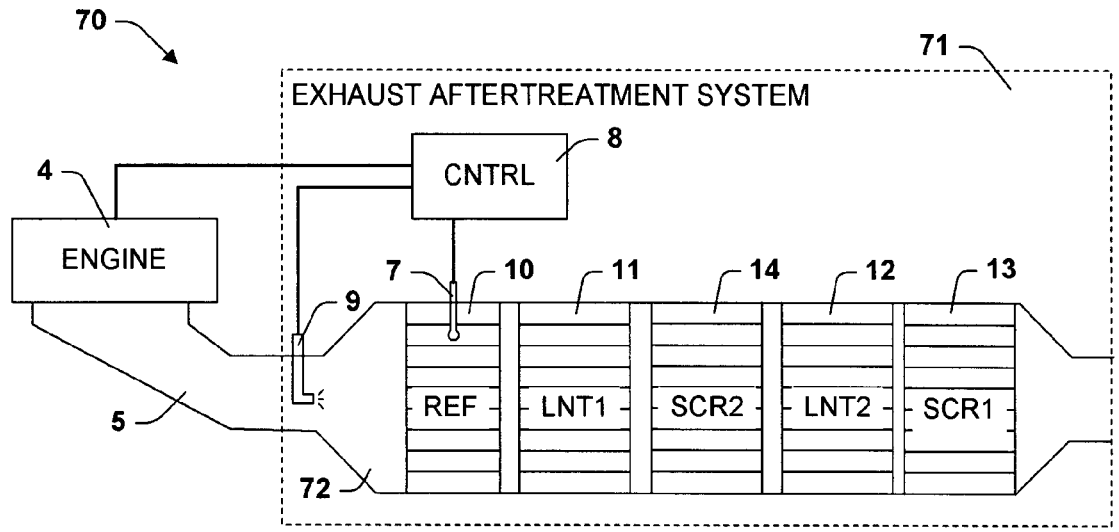
FIG. 7 is a schematic illustration of yet another exemplary power generation system conceived by the inventor.

According to another of the inventors concepts, a second SCR catalyst 14 is selected and configured as illustrated by the exemplary power generation system 700 in FIG. 7. The second SCR catalyst 14 is configured after the LNT 11 and before the LNT 12. The second SCR catalyst 14 has a different composition than the SCR catalyst 13 and augments the first SCR catalyst 13 by providing performance in a lower temperature operating range than that of the SCR catalyst 13. According to one of the inventors' concepts, the SCR catalyst 13 has a higher maximum safe temperature than the SCR catalyst 14 in order to facilitate desulfation of the system with temperatures increasing along the direction of exhaust flow.

Figure 8:
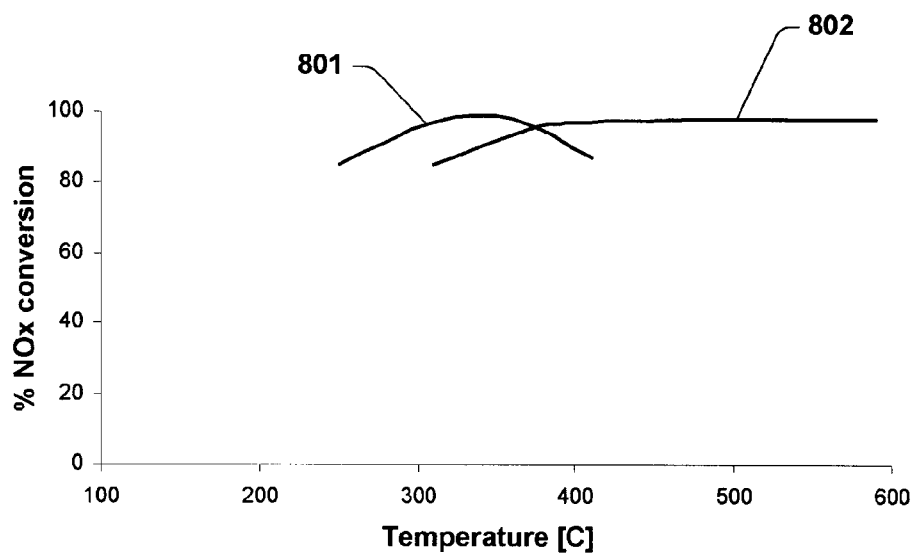
FIG. 8 is a plot showing the effect of operating temperature ranges of two SCR catalysts having different compositions.

FIG. 8 provides NOx conversion efficiency curves for two SCR catalysts with different effective operating temperature ranges. Line 801 was obtained for a vanadium-based SCR catalyst. The vanadium-based SCR catalyst shows effectiveness from about 250° C. to about 450° C. and is suitable for use as the second SCR catalyst 14. Line 802 was obtained for a zeolite-based SCR catalyst. The zeolite-based SCR catalyst shows effectiveness from about 350° C. to about 475° C. and is suitable for use as the first SCR catalyst 13. The zeolite-based SCR catalyst is also able to endure higher temperatures than the vanadium-based SCR catalyst. A variety of different zeolite-based SCR catalysts are known. Each will have a different operating temperature window. Thus both the high temperature SCR catalyst 13 and the low temperature SCR catalyst 12 can be zeolite-based SCR catalysts.

According to the inventors concept, desulfation is carried our in such a way that the second LNT 12 develops higher temperatures than the first LNT 11. Preferably, the second LNT 12 reaches a volume average temperature at least about 25° C. higher than the first LNT 11, more preferably at least about 50° C., still more preferably at least about 100° C. The volume average is taken over the substrate volume. When the point-wise temperatures of the LNTs are oscillating with the frequency of the fuel pulses, the peak temperatures over the course of a pulse period can be used in calculating the volume average temperatures.

In the exemplary power generation systems 1, 500, and 600, the exhaust is made rich using an inline reformer 10. The concepts disclosed herein extend to other methods of making the exhaust rich. Another method may involve using the engine 4 to remove excess oxygen from the exhaust, for example, operating the engine 4 with a stoichiometric or rich fuel-air mixture if the engine is of such a design that this is possible. Reformate or another reductant other than diesel fuel can be injected into the exhaust. Excess oxygen can be removed by combustion of reductant in a device other than a fuel reformer 10, such as an oxidation or three-way catalyst. In addition, it should be noted that fuel can be injected into the exhaust by an engine fuel injector rather than an exhaust line fuel injector.

Although the Figures do not show DPFs, at least one DPF will typically be included in a diesel exhaust aftertreatment system. The DPF can be placed at any suitable location in the exhaust aftertreatment system. Suitable locations can include upstream from the fuel reformer 10, between the fuel reformer 10 and the LNT 11, between the LNT 12 and the SCR catalyst 13, and downstream from the SCR catalyst 13. One possible advantage of placing the DPF upstream from the LNTs 11 and 12 is that NOx concentrations are high, facilitating continuous regeneration. Downstream from the fuel reformer 10, oxidation of NO to $NO_2$ in the fuel reformer 10 can facilitate DPF regeneration. Also, if placed downstream from the fuel reformer 10, the fuel reformer 10 can be used to heat the DPF for regeneration. Between the fuel reformer 10 and the LNTs 11 and 12, the DPF can provide a thermal mass ameliorating temperature excursion in the LNTs 11 and 12 during denitrations. Such temperature excursions can reduce the life of the LNTs 11 and 12. Downstream from the SCR catalyst 13 may be a preferred location if the DPF has a catalyst that could oxidize $NH_3$. Accordingly, the preferred location for the DPF depends on the type of DPF and other particular of the various system components.

A DPF can be a wall flow filter or a pass through filter and can use primarily either depth filtration of cake filtration. Cake filtration is the primary filter mechanism in a wall flow filter. In a wall flow filter, the soot-containing exhaust is forced to pass through a porous medium. Typical pore diameters are from about 1 to about 30 μm. Soot particles are most commonly from about 10 to about 50 nm in diameter. In a fresh wall flow filter, the initial removal is by depth filtration, with soot becoming trapped within the porous structure.

Quickly, however, the soot forms a continuous layer on an outer surface of the porous structure. Subsequent filtration is through the filter cake and the filter cake itself determines the filtration efficiency. As a result, the filtration efficiency increases over time.

In contrast to a wall flow filter, in a flow through filter the exhaust is channeled through macroscopic passages and the primary mechanism of soot trapping is depth filtration. The passages may have rough walls, baffles, and bends designed to increase the tendency of momentum to drive soot particles against or into the walls, but the flow is not forced though micro-pores. The resulting soot removal is considered depth filtration, although the soot is generally not distributed uniformly with the depth of any structure of the filter. A flow through filter can also be made from temperature resistant fibers, such as ceramic or metallic fibers, that span the device channels. A flow through filter can be larger than a wall flow filter having equivalent thermal mass Diesel particulate filters must be regenerated from time-to-time to remove accumulated soot. Two general approaches to DPF regeneration are continuous and intermittent regeneration. In continuous regeneration, a catalyst is generally provided upstream of the DPF to convert NO to $NO_2$. $NO_2$ can oxidize soot at typical diesel exhaust temperatures and thereby effectuate continuous regeneration. Intermittent regeneration involves heating the DPF to a temperature at which soot combustion is self-sustaining in a lean environment. Typically this is a temperature from about 400 to about 700° C., depending in part on what type of catalyst coating has been applied to the DPF to lower the soot ignition temperature.

While the engine 4 is preferably a compression ignition diesel engine, the various concepts of the inventor are applicable to power generation systems with lean-burn gasoline engines or any other type of engine that produces an oxygen rich, NOx-containing exhaust. For purposes of the present disclosure, NOx consists of NO and $NO_2$.

The power generation system can have any suitable type of transmission. A transmission can be a conventional transmission such as a counter-shaft type mechanical transmission, but is preferably a CVT. A CVT can provide a much larger selection of operating points than a conventional transmission and generally also provides a broader range of torque multipliers. The range of available operating points can be used to control the exhaust conditions, such as the oxygen flow rate and the exhaust hydrocarbon content. A given power demand can be met by a range of torque multiplier-engine speed combinations. A point in this range that gives acceptable engine performance while best meeting a control objective, such as minimum oxygen flow rate, can be selected.

In general, a CVT will also avoid or minimize interruptions in power transmission during shifting. Examples of CVT systems include hydrostatic transmissions; rolling contact traction drives; overrunning clutch designs; electrics; multi-speed gear boxes with slipping clutches; and V-belt traction drives. A CVT may involve power splitting and may also include a multi-step transmission.

A preferred CVT provides a wide range of torque multiplication ratios, reduces the need for shifting in comparison to a conventional transmission, and subjects the CVT to only a fraction of the peak torque levels produced by the engine. This can be achieved using a step-down gear set to reduce the torque passing through the CVT. Torque from the CVT passes through a step-up gear set that restores the torque. The CVT is further protected by splitting the torque from the engine, and recombining the torque in a planetary gear set. The planetary gear set mixes or combines a direct torque element transmitted from the engine through a stepped automatic transmission with a torque element from a CVT, such as a band-type CVT. The combination provides an overall CVT in which only a portion of the torque passes through the band-type CVT.

The fuel reformer 10 is a device that converts heavier fuels into lighter compounds without fully combusting the fuel. The fuel reformer 10 can be a catalytic reformer or a plasma reformer. Preferably, the fuel reformer 10 is a partial oxidation catalytic reformer comprising a steam reforming catalyst, such as Rh. Examples of catalysts that may be used in fuel reformers include precious metals, such as Pt, Pd, and Rh, and oxides of Al, Mg, and Ni, the later group being typically combined with one or more of CaO, $K_2O$, and a rare earth metal such as Ce to increase activity. The fuel reformer 10 is preferably small in size as compared to an oxidation catalyst or a three-way catalyst designed to perform its primary functions at temperatures below 450° C. The reformer 10 is generally operative at temperatures within the range from about 450 to about 1100° C.

The LNTs 11 and 12 can comprise any suitable NOx-adsorbing material. Examples of NOx adsorbing materials include oxides, carbonates, and hydroxides of alkaline earth metals such as Mg, Ca, Sr, and Ba or alkali metals such as K or Cs. Further examples of NOx-adsorbing materials include alumina, silica, and molecular sieves, such as zeolites. Still further examples include metal phosphates, such as phosphates of titanium and zirconium.

The LNTs 11 and 12 also comprise a catalyst for the reduction of NOx in a reducing environment. The catalyst can be, for example, one or more transition metals, such as Au, Ag, and Cu, group VIII metals, such as Pt, Rh, Pd, Ru, Ni, and Co, Cr, or Mo. A typical catalyst includes Pt and Rh. Precious metal catalysts also facilitate the adsorbent function of alkaline earth oxide absorbers. Depending on the formulation, each LNT has a different effective operating temperature range and any suitable pair of composition can be selected.

Adsorbents and catalysts according to the present invention are generally adapted for use in vehicle exhaust systems. Vehicle exhaust systems create restriction on weight, dimensions, and durability. For example, a NOx adsorbent bed for a vehicle exhaust systems must be reasonably resistant to degradation under the vibrations encountered during vehicle operation.

The ammonia-SCR catalysts 13 and 14 are catalysts functional to catalyze reactions between NOx and $NH_3$ to reduce NOx to $N_2$ in lean exhaust. Examples of SCR catalysts include oxides of metals such as Cu, Zn, V, Cr, Al, Ti, Mn, Co, Fe, Ni, Pd, Pt, Rh, Rd, Mo, W, and Ce, and zeolites, such as ZSM-5 or ZSM-11, substituted with metal ions such as cations of Cu, Co, Ag, Zn, and Pt. Preferably, the ammonia-SCR catalysts 13 and 14 are designed to tolerate temperatures required to desulfate the LNTs 11 and 12.

Although not illustrated in any of the figures, a clean-up catalyst can be placed downstream of the other aftertreatment device. A clean-up catalyst is preferably functional to oxidize unburned hydrocarbons from the engine 4, unused reductants, and any $H_2S$ released from the LNTs 11 and 12 and not oxidized by the ammonia-SCR catalyst 13 and 14. Any suitable oxidation catalyst can be used. To allow the clean-up catalyst to function under rich conditions, the catalyst may include an oxygen-storing component, such as ceria. Removal of $H_2S$, where required, may be facilitated by one or more additional components such as NiO, $Fe_2O_3$, $MnO_2$, CoO, and $CrO_2$.

The invention as delineated by the following claims has been shown and/or described in terms of certain concepts, components, and features. While a particular component or feature may have been disclosed herein with respect to only one of several concepts or examples or in both broad and narrow terms, the components or features in their broad or narrow conceptions may be combined with one or more other components or features in their broad or narrow conceptions wherein such a combination would be recognized as logical by one of ordinary skill in the art. Also, this one specification may describe more than one invention and the following claims do not necessarily encompass every concept, aspect, embodiment, or example described herein.

The invention claimed is:

1. A method of operating a power generation system, comprising:
   operating an engine to produce an exhaust comprising $NO_X$;
   channeling the exhaust through a fuel reformer;
   channeling the exhaust through a first lean $NO_X$ trap that adsorbs and stores a first portion of $NO_X$ from the exhaust and is configured downstream from the fuel reformer;
   channeling the exhaust through a second lean $NO_X$ trap that adsorbs and stores a second portion of $NO_X$ from the exhaust, the second lean $NO_X$ trap being configured downstream from the first lean $NO_X$ trap and having a different composition from that of the first lean $NO_X$ trap;
   generating a first control signal to denitrate the lean $NO_X$ traps;
   in response to the first control signal, supplying a rich fuel-exhaust mixture to the fuel reformer whereby the fuel reformer produces a reformate-containing rich exhaust-reductant mixture that denitrates the lean $NO_X$ traps;
   generating a second control signal to desulfate the lean $NO_X$ traps; and
   in response to the second control signal, heating the lean $NO_X$ traps and then supplying a rich fuel-exhaust mixture to the fuel reformer, whereby the fuel reformer produces reformate-containing rich exhaust-reductant mixture that desulfates the lean $NO_X$ traps;
   wherein the desulfation is carried out in such a manner that during the desulfation the second lean $NO_X$ trap reaches a peak volume average temperature at least about 25° C. higher than the first lean $NO_X$ trap and the difference in composition causes the first lean $NO_X$ trap to reach an effective desulfation rate at a lower temperature than that at which the second lean $NO_X$ trap reaches an effective desulfation rate.

2. The method of claim 1, wherein the fuel reformer produces reformate by steam reforming reactions.

3. The method of claim 1, wherein:
   the first and second lean $NO_X$ traps each have maximum safe desulfation temperatures that are maximum temperatures at which the lean $NO_X$ traps can be desulfated without undergoing an unacceptable loss of activity; and
   the maximum safe desulfation temperature for the second lean $NO_X$ trap is greater than the maximum safe desulfation temperature for the first lean $NO_X$ trap.

4. The method of claim 1, wherein
   desulfation comprises pulsing a fuel injection into the exhaust upstream from the fuel reformer and thereby alternating between rich phases in which a rich fuel-exhaust mixture is supplied to the fuel reformer and the fuel reformer supplies reductant to the lean $NO_X$ traps and lean phases in which no fuel is supplied to the fuel reformer; and
   a portion of the reductant combusts in the first lean $NO_X$ trap, causing the exhaust to heat as it passes through the first lean $NO_X$ trap.

5. The method of claim 1, further comprising:
   channeling the exhaust from the second lean $NO_X$ trap through a first ammonia-selective catalytic reduction catalyst;
   wherein some of the adsorbed $NO_X$ in the first and or the second lean $NO_X$ trap is reduced to ammonia during denitration, some of which ammonia is adsorbed and stored in the first ammonia-selective catalytic reduction catalyst and used to reduce $NO_X$ slipping past the lean $NO_X$ traps during a subsequent lean phase.

6. The method of claim 5, further comprising:
   channeling the exhaust from the first lean $NO_X$ trap through a second ammonia-selective catalytic reduction catalyst prior to channeling the exhaust through the second lean $NO_X$ trap;
   wherein some of the adsorbed $NO_X$ in the first lean $NO_X$ trap is reduced to ammonia during denitration, some of which ammonia is adsorbed and stored in the second ammonia-selective catalytic reduction catalyst and used to reduce $NO_X$ slipping past the first lean $NO_X$ trap during a subsequent lean phase.

7. The method of claim 6, wherein first ammonia-selective catalytic reduction catalyst is adapted to tolerate higher temperatures than the second ammonia-selective catalytic reduction catalyst.

8. A method of operating a power generation system, comprising:
   operating an engine to produce an exhaust comprising $NO_X$;
   channeling the exhaust through a fuel reformer;
   channeling the exhaust through a first lean $NO_X$ trap that adsorbs and stores a first portion of $NO_X$ from the exhaust and is configured downstream from the fuel reformer;
   channeling the exhaust through a second lean $NO_X$ trap that adsorbs and stores a second portion of $NO_X$ from the exhaust, the second lean $NO_X$ trap being configured downstream from the first lean $NO_X$ trap and having a different composition from that of the first lean $NO_X$ trap;
   generating a first control signal to denitrate the lean $NO_X$ traps;
   in response to the first control signal, supplying a rich fuel-exhaust mixture to the fuel reformer whereby the fuel reformer produces a reformate-containing rich exhaust-reductant mixture that denitrates the lean $NO_X$ traps;
   generating a second control signal to desulfate the lean $NO_X$ traps; and
   in response to the second control signal, heating the lean $NO_X$ traps and then supplying a rich fuel-exhaust mixture to the fuel reformer, whereby the fuel reformer produces reformate-containing rich exhaust-reductant mixture that desulfates the lean $NO_X$ traps;
   wherein the desulfation is carried out in such a manner that during the desulfation the second lean $NO_X$ trap reaches a peak volume average temperature at least about 25° C. higher than the first lean $NO_X$ trap; and
   wherein the first and second lean $NO_X$ traps each have maximum safe desulfation temperatures that are maximum temperatures at which the lean $NO_X$ traps can be desulfated without undergoing an unacceptable loss of activity, and the maximum safe desulfation temperature for the second lean $NO_X$ trap is greater than the maximum safe desulfation temperature for the first lean $NO_X$ trap.

9. The method of claim 8, wherein desulfation comprises pulsing a fuel injection into the exhaust upstream from the fuel reformer and thereby alternating between rich phases in which a rich fuel-exhaust mixture is supplied to the fuel reformer and the fuel reformer supplies reductant to the LNTs and lean phases in which no fuel is supplied to the fuel reformer; and a portion of the reductant combusts in the first lean $NO_X$ trap, causing the exhaust to heat as it passes through the first lean $NO_X$ trap.

10. The method of claim 8, wherein the fuel reformer produces reformate by steam reforming reactions.

11. The method of claim 8, wherein the first and second lean $NO_X$ trap are substantially free of potassium.

12. The method of claim 8, wherein the first lean $NO_X$ trap comprises at least about 10 $g/ft^3$ platinum and the second lean $NO_X$ trap comprises at least a 25% higher concentration of platinum than the first lean $NO_X$ trap.

13. The method of claim 8, further comprising:

channeling the exhaust from the second lean $NO_X$ trap through a first ammonia-selective catalytic reduction catalyst;

wherein some of the adsorbed $NO_X$ in the first and or the second lean $NO_X$ trap is reduced to ammonia during denitration, some of which ammonia is adsorbed and stored in the first ammonia-selective catalytic reduction catalyst and used to reduce $NO_X$ slipping past the lean $NO_X$ traps during a subsequent lean phase.

14. The method of claim 13, further comprising:

channeling the exhaust from the first lean $NO_X$ trap through a second ammonia-selective catalytic reduction catalyst prior to channeling the exhaust through the second lean $NO_X$ trap;

wherein some of the adsorbed $NO_X$ in the first lean $NO_X$ trap is reduced to ammonia during denitration, some of which ammonia is adsorbed and stored in the second ammonia-selective catalytic reduction catalyst and used to reduce $NO_X$ slipping past the first lean $NO_X$ trap during a subsequent lean phase.

15. The method of claim 14, wherein first ammonia-selective catalytic reduction catalyst is adapted to tolerate higher temperatures than the second ammonia-selective catalytic reduction catalyst.

16. A power generation system, comprising:

an engine operative to produce exhaust comprising $NO_X$;

a fuel reformer configured to receive and pass on at least a portion of the exhaust produced by the engine and operative to produce reformate when the fuel reformer is sufficiently warm, fuel is provided to the exhaust, and the resulting exhaust-fuel mixture is overall rich;

a first lean $NO_X$ trap configured to receive at least a portion of the exhaust from the fuel reformer; and a second lean $NO_X$ trap configured to receive at least a portion of the exhaust from the first lean $NO_X$ trap;

wherein each of the lean $NO_X$ traps is adapted to store $NO_X$ when the exhaust from the fuel reformer is free of reformate and to reduce stored $NO_X$ and regenerate when the exhaust-reformate mixture from the fuel reformer is rich; and the second lean $NO_X$ trap is adapted for desulfation at higher temperatures than is the first lean $NO_X$ trap.

17. The power generation system of claim 16, further comprising:

a first ammonia-selective catalytic reduction catalyst configured to receive at least a portion of the exhaust from the second lean $NO_X$ trap;

a second ammonia-selective catalytic reduction catalyst configured to receive at least a portion of the exhaust from the first lean $NO_X$ trap;

wherein the first and second ammonia-selective catalytic reduction catalyst are adapted to store ammonia and reduce $NO_X$ contained in the exhaust by catalyzing reactions between the $NO_X$ and stored ammonia when the exhaust is lean; and the first ammonia-selective catalytic reduction catalyst is adapted to tolerate higher temperatures than the second ammonia-selective catalytic reduction catalyst.

18. The power generation system of claim 16, wherein the fuel reformer is adapted to produce reformate by steam reforming reactions.

19. The power generation system of claim 16, wherein the first and second lean $NO_X$ traps are substantially free of potassium.

20. The power generation system of claim 16, wherein the first lean $NO_X$ trap comprises at least about 10 $g/ft^3$ platinum and the second lean $NO_X$ trap comprises at least a 25% higher concentration of platinum than the first lean $NO_X$ trap.

* * * * *